Figure 1:
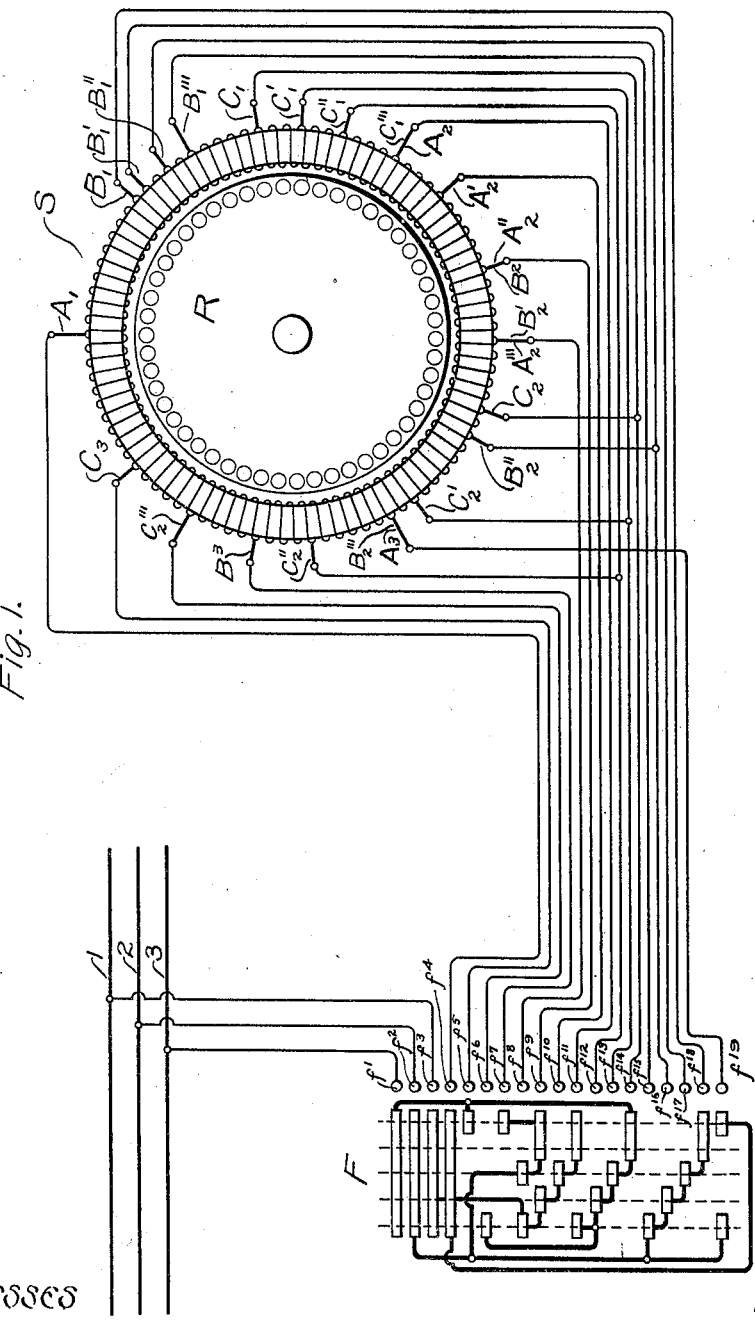

No. 835,444. PATENTED NOV. 6, 1906.
M. C. A. LATOUR.
INDUCTION MOTOR CONTROL.
APPLICATION FILED MAR. 27, 1905.

2 SHEETS—SHEET 1.

Witnesses
J. Ellis Glen.
Helen Orford

Inventor.
Marius C. A. Latour.
By Albert G. Davis
Atty.

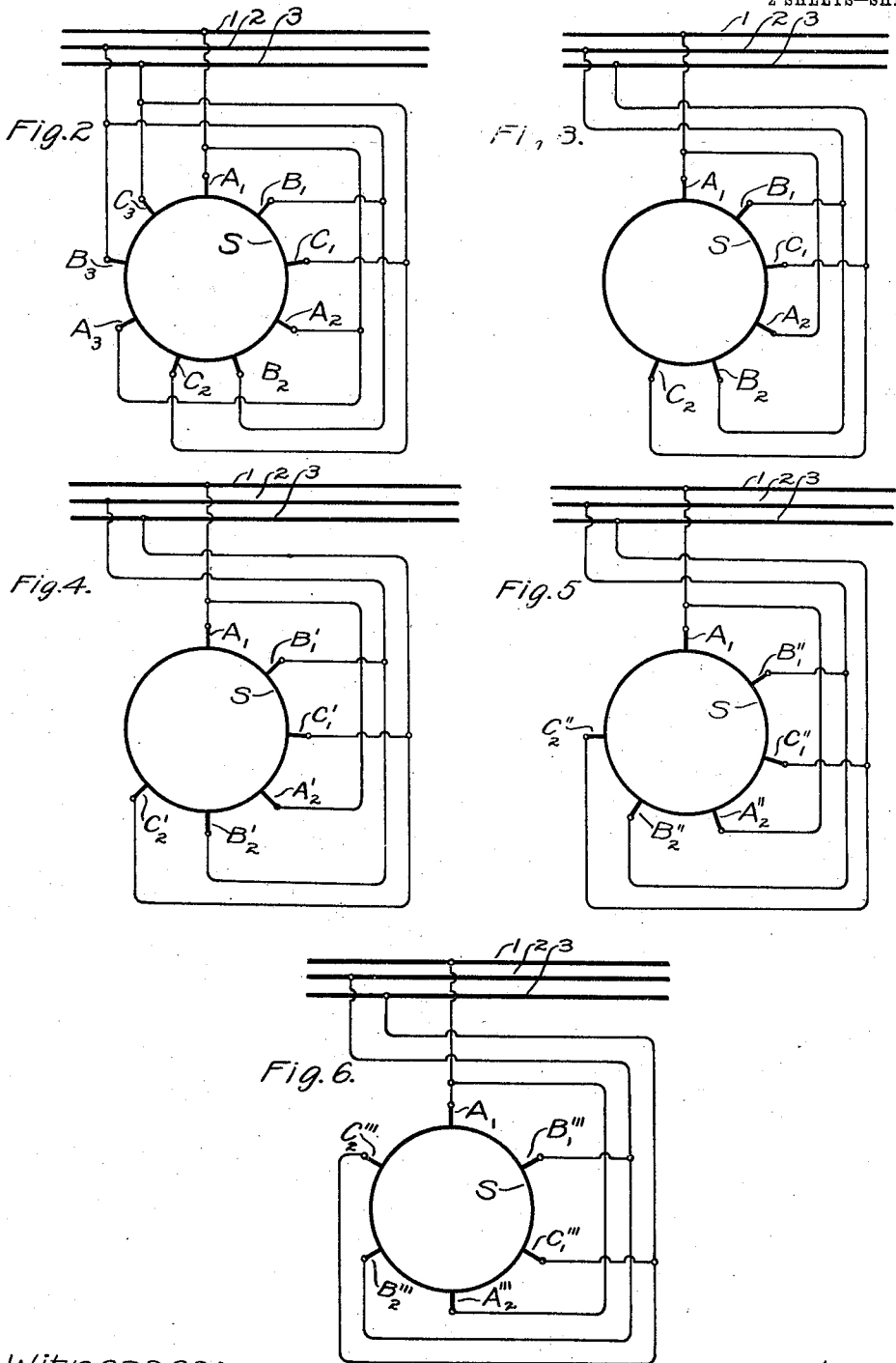

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

INDUCTION-MOTOR CONTROL.

No. 835,444.   Specification of Letters Patent.   Patented Nov. 6, 1906.

Application filed March 27, 1905. Serial No. 252,212.

*To all whom it may concern:*

Be it known that I, MARIUS C. A. LATOUR, a citizen of France, residing at Paris, France, have invented certain new and useful Improvements in Induction-Motor Control, of which the following is a specification.

My invention relates to the control of induction-motors; and its object is to provide means for obtaining a plurality of speeds with such motors when supplied with current of a given frequency without the use of resistances in the secondary circuit. In induction-motors the rotor speed is determined by the speed of the revolving field, the resistance of the secondary circuit, and the load upon the motor. With a constant resistance in the rotor-circuit and a constant load on the motor the speed is determined by the number of poles produced by the stator-winding, since the number of poles determines the speed with which the field flux revolves.

My invention consists in the method of controlling an induction-motor which consists in gradually varying the speed at which the field-flux revolves, or, more specifically stated, it consists in gradually shifting the terminal connections of the primary winding in passing from one number of poles to another, so that a plurality of speeds are obtained intermediate the speeds which are obtained when the motor is connected first for one and then for another number of poles.

My invention will best be understood by reference to the accompanying drawings, in which—

Figure 1 shows, somewhat diagrammatically, an induction-motor and controlling-switch arranged in accordance with my invention; and Figs. 2 to 6 represent diagrammatically the motor connections produced by the controlling-switch in its several positions.

Referring first to Fig. 1, S represents the stator of an induction-motor which, for the sake of simplicity, I have shown as of the Gramme-ring type. It will be understood, however, that other well-known forms of winding, such as a drum-winding, arranged in slots on the inner periphery of the field structure, may be used. R represents the rotor or secondary member, which I have indicated as a short-circuited squirrel-cage. 1, 2, and 3 represent three leads from a source of three-phase current to which the stator of the motor is connected through the controlling-switch F.

When the controlling-switch is in the first of its positions, as indicated by the dotted lines, the following circuits are established: line-wire 1 is connected through contact-finger $f^3$ and contact-finger $f^4$ to the motor-terminal $A_1$, and through the fingers $f^3$ and $f^{11}$ to the motor-terminal $A_2$, and through the fingers $f^3$ and $f^{19}$ to the motor-terminal $A_3$. Similarly, line-wire 2 is connected to the motor-terminals $B_1$, $B_2$, and $B_3$, while the line-wire 3 is connected to the motor-terminal $C_1$, $C_2$, and $C_3$. The motor is thus connected as a six-pole three-phase induction-motor. This connection is indicated diagrammatically in Fig. 2, the motor-terminals which are not in circuit being omitted. In moving to the second position the controlling-switch breaks the connections from the source to motor-terminals $A_3$, $B_3$, and $C_3$ at the contacts $f^{19}$, $f^7$, and $f^5$, respectively, thereby establishing the connections shown in Fig. 3. Although three of the motor-terminals are thus open-circuited and the motor is connected as an asymmetrical four-pole motor, it still operates as a six-pole motor, since the speed of rotation of the flux as determined by the part of the stator-winding still connected to the source is the same as before, the remaining part of the stator-winding being practically idle as far as its effect upon the rotor speed is concerned. In moving from the second to its third position, the circuit of terminal $A_2$ is broken at contact-finger $f^{11}$ and a circuit is established by the contact-finger $f^{10}$ from line-wire 1 to motor-terminal $A'_2$. Similarly, the connections from line-wire 2 are shifted from terminals $B_1$ and $B_2$ to $B'_1$ and $B'_2$, while the connections from line-wire 3 are shifted from $C_1$ and $C_2$ to $C'_1$ and $C'_2$. These connections are indicated in Fig. 4. The relative distance between the motor-terminals is consequently increased, thereby increasing the speed of rotation of the flux and the speed of the rotor, although the number of poles is not changed. In moving to its fourth position the controlling-switch F breaks the connection of contact $A'_2$ at finger $f^{10}$ and establishes a connection through finger $f^9$ to terminal $A''_2$. Similarly, the connections from line-wire 2 are shifted from $B'_1$ and $B'_2$ to $B''_1$ and $B''_2$, while the connections from line-wire 3 are shifted from $C'_1$ and $C'_2$ to $C''_1$ and $C''_2$. These connections are shown in Fig. 5. In moving into its last position controlling-switch F breaks the connection with motor-terminal $A''_2$ at finger $f^9$ and establishes a connection through finger $f^8$ to terminal $A'''_2$, which happens to be the same as terminal $B'_2$. Similarly, the connection from line-wire 2 is shifted from terminal $B''_1$ and $B''_2$ to $B'''_1$ and $B'''_2$, which latter terminal happens to be the same as terminal $A_3$, while connection from line-wire 3 is shifted from terminal $C''_1$ and $C''_2$ to $C'''_1$ and $C'''_2$, the terminal $C'''_1$ being the same as terminal $A_2$. These connections, which are shown in Fig. 6, are the usual symmetrical connections for a four-pole motor, and speed as compared with the connection shown in Fig. 2 is increased in the ratio of 2 to 3.

By my invention it is rendered possible to obtain not only the speed corresponding to the usual six-pole and four-pole connections, but also by varying the distance between poles without changing their number to secure a plurality of intermediate speeds not obtainable with the methods of speed control employed heretofore.

I do not desire to limit myself to the particular construction and arrangement of parts here shown, but aim in the appended claims to cover all modifications which are within the scope of my invention.

What I claim as new, and desire to secure by Letters Patent of the United States, is—

1. The method of controlling an induction-motor to obtain speeds intermediate the speeds corresponding to two different numbers of poles, which consists in supplying to the motor-terminals alternating current of constant frequency and gradually varying the speed of rotation of the field flux by shifting the position of the poles without changing their number.

2. The method of controlling an induction-motor to obtain speeds intermediate the speeds corresponding to two different numbers of poles, which consists in varying the distance between poles without varying their number.

3. The method of increasing the speed of a multipolar induction-motor, which consists in breaking the connections from the source to one set of primary terminals and then gradually shifting the remaining terminals till a symmetrical terminal arrangement is reached.

4. The method of increasing the speed of a multipolar induction-motor which consists in removing one pair of poles and then gradually separating the remaining poles till a symmetrical arrangement is reached.

5. The method of controlling an induction-motor, which consists in connecting a source of current to a number of symmetrically-arranged points on the primary winding of the motor so as to produce a definite number of poles, then breaking the connection to a portion of said points, and then gradually shifting the remaining points of connection until the points of connection are again symmetrical.

6. In combination, an induction-motor having a primary winding provided with terminal connections for producing different pole numbers and intermediate taps between said terminals, and a controlling-switch in circuit with said taps.

7. In combination, an induction-motor having a primary winding provided with terminal connections for producing different pole numbers and intermediate taps between said terminals, and a controlling-switch adapted to connect either set of terminals or the intermediate taps to a source of current.

8. In combination, an induction-motor having a primary winding provided with terminal connections for producing different pole numbers and intermediate taps between said terminals, and a controlling-switch having its contacts arranged to connect a set of terminals for one number of poles to a source of current, then to break said connections and to connect the intermediate taps successively to the source, and finally to connect the terminals for the second number of poles to the source.

9. In combination, an induction-motor having a primary winding provided with terminal connections for producing different pole numbers and intermediate taps unsymmetrically arranged between said terminals, and a controlling-switch adapted to connect either set of terminals or said taps to a source of current.

10. In combination, an induction-motor having a primary winding provided with terminal connections for producing two different pole numbers and intermediate taps corresponding in number to the terminals for the smaller number of poles but unsymmetrically placed, and a switch adapted to connect either set of terminals or said taps to a source of current.

In witness whereof I have hereunto set my hand this 14th day of March, 1905.

MARIUS C. A. LATOUR.

Witnesses:
 JOHN BAKER,
 ROBERT A. BAKER.